May 23, 1933. F. ADAMS 1,910,664
JOURNAL CONSTRUCTION
Original Filed Dec. 22, 1930
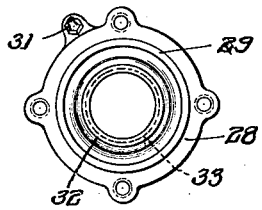
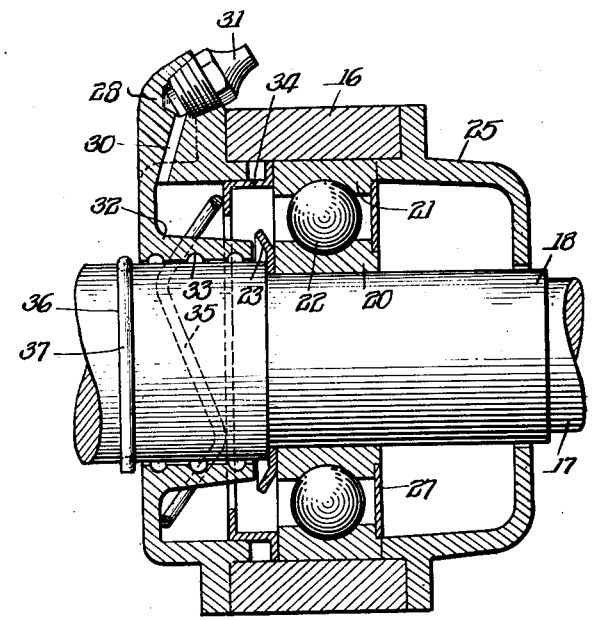
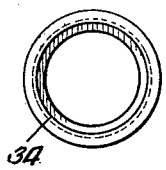
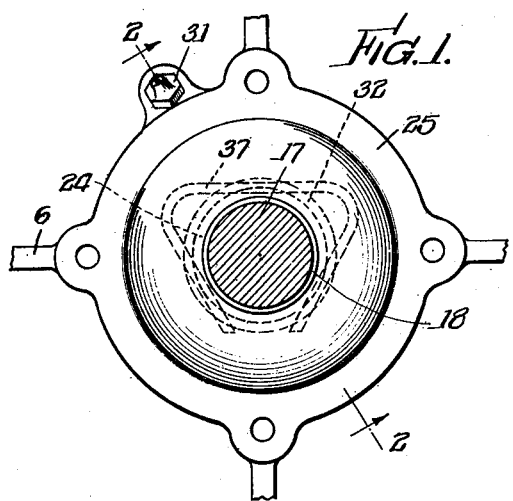
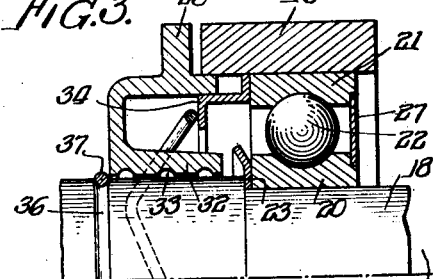
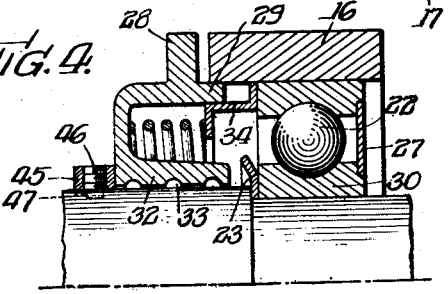
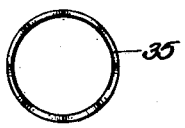
Inventor:
Frank Adams
By: Cheever, Cox & Moore
attys.

Patented May 23, 1933

1,910,664

UNITED STATES PATENT OFFICE

FRANK ADAMS, OF MANSFIELD, OHIO, ASSIGNOR TO IDEAL ELECTRIC & MANUFACTURING CO., OF MANSFIELD, OHIO, A CORPORATION OF OHIO

JOURNAL CONSTRUCTION

Original application filed December 22, 1930, Serial No. 503,928. Divided and this application filed April 8, 1931. Serial No. 528,580.

My present invention relates in general to a journal construction and has more particular reference to a dust-proof, self-lubricating bearing, the same comprising separate subject matter of invention divided from my co-pending application, Serial Number 503,928, filed December 22, 1930, for electric motor.

One object of my invention is to provide a journal having means to exclude foreign matter, such as dust and dirt, entering the journal parts.

Another object of the invention is to provide a bearing an oil or grease chamber incorporated therein and having means to permit the chamber to be loaded at intervals, the bearing also including a novel construction whereby leakage of the lubricant along the shaft carried in the bearing is substantially prevented.

Another object of the invention is to provide a journal having a rotated shaft having self-regulating means and providing efficient and substantial oil sealing means to prevent the escape of the lubricant along the motor shaft. The journal is of simple construction and easily excessible to facilitate assembly and disassembly.

Another object of this invention is to provide the bearings with lubricating means which will effectively lubricate the bearings irrespective of whether the motor is mounted on the floor, the ceiling or a side wall, it only being necessary to change the adjustment of the various parts a slight amount in order to effect this result.

Another object of this invention is to provide a lubricating means for the bearings which is protected from dust and dirt when the bearing is removed from its support or when the motor is partially disassembled. This lubricating means comprises, preferably, means for injecting a grease into intimate contact with the bearing and for substantially enclosing the bearing and grease even when the bearing is removed from its support. Such a grease sealing assembly is adapted to be used at one or both sides of a standard bearing and is designed to contain a sufficient quantity of grease so as not to require regreasing of the bearing except at long intervals.

Another object of this invention is to prevent the leakage of lubricant along the motor shaft.

Another object of this invention is to provide a bearing of the class described, which is simple in construction to facilitate assembly and disassembly, which is rugged and durable in operation and inexpensive to manufacture.

Numerous other objects and advantages will be apparent from the following description, which, taken in connection with the accompanying drawing, discloses preferred embodiments of my invention.

Referring to the drawing:

Figure 1 is a perspective view showing the end halves of a journal embodying my present invention;

Figure 2 is a cross-section taken substantially along the line 2—2 in Figure 1;

Figure 3 is a fragmentary view showing the parts, illustrated in Figure 2, in shifted position as a part of the adjustment of the bearing;

Figure 4 is similar to Figure 3 and illustrates a modified construction embodying the invention;

Figure 5 is a view similar to Figure 2, showing the bearing with its cap removed, and Figures 6 and 7 are elevational views of elements embodied in the bearing assembly.

To illustrate my invention, I have shown on the drawing a self-lubricating, dustless journal well adapted for general bearing purposes wherever it is necessary to support a rotating shaft. The journal, however, is especially adapted for incorporation in electrical and other machinery such as motors, generators, pumps and the like.

Referring now more particularly to the drawing, it will be noted that the bearing and bearing support is mounted in a frame 16, which may be any suitable wall portion or frame in which the journal is to be mounted.

This bearing is of the anti-friction or ball-bearing type. The ball-bearing comprises an inner race 20 and an outer race 21 between which are interposed the balls 22 as in the usual ball bearing construction. The inner race 20 is press-fitted on the bearing portion 18 of the shaft 17. Before pressing the race 20 on the bearing surface 18, a ring 23 is placed over the bearing portion 18, and when the race is pressed onto the bearing portion 18, this ring 23 is brought into abutting relation with a shoulder 24 on the shaft 17 and held in that position by the race 20. This ring is what is known as a grease "slinger" and derives its name from the fact that as the shaft 17 rotates, any grease which contacts with the ring will be thrown outwardly and for a purpose which will appear presently. Against the outer side of the race 21, I arrange the bearing cap 25 which has an annular portion 26 fitting within the annular bearing support 16, to center the bearing cap with respect to the shaft. A primary grease seal 27 closes one end of the space between the races 20 and 21, and is held in position by being secured to one or the other of the races.

On the other side of the ball bearing I arrange a bearing cap 28 which has the annular portion 29 arranged within the bearing support 16 to center the bearing cap with respect to the bearing support. Bolts 29 hold the bearing caps 25 and 28 against the opposite sides of the bearing support 16. The bearing cap 28 is provided with a grease inlet 30 and a pressure grease inlet 31 which permits the entrance of grease under pressure to the passage 30, but excludes the dirt which might accumulate thereon. The bearing cap is also provided with an annular portion 32 which surrounds the shaft 17 and has grooves 33 therein to assist in preventing the leakage of grease out of the bearing cap 28. This method is conventional and needs no further description here. A secondary grease retaining ring 34 having a cross-section substantially as shown in Figure 1 is arranged between the annular portion 29 of the inner bearing cap 28 and the outer race 21. A spring 35 of the shape clearly illustrated in Figures 1 and 6 surrounds the annular portion 32 of the bearing cap 28 and abuts against the secondary grease retaining ring 34 so as to hold the grease retaining ring against the outer race 21 while at the same time permitting the race 21 and ring 34 to move relatively to each other. The inner bearing cap 28 is large enough to contain a large supply of grease so as not to require a replenishing of the same except after a long period of use.

With the construction of the bearing just described, it will be seen that the grease "slinger" 23, secondary grease retaining ring 34, primary grease retaining ring 27 and bearing caps 25 and 28 effectively retain the grease and prevent the same from working out onto the motor parts which are outside of the bearing caps.

Another advantage of the grease retaining means which I have disclosed is that bearings may be partially dismantled or the motor itself may be partially dismantled without exposing the bearing to foreign matter thereby maintaining the grease in perfect condition for lubrication, it being well understood that it is extremely objectionable to have foreign matter in the lubricating grease for the motor. In order to accomplish this result, I provide an annular groove 36 in the shaft 17 and I provide a substantially triangular spring clip 37 which is snapped into the groove 36 so that a portion of each of the three sides thereof is arranged within the groove 36. Let us assume now that it is desired to dismantle the bearing. In order to do this, the bearing cap 25 is taken off after the bolts 29 have been removed. The removal of the bearing cap 25 causes the spring 35 to move the inner bearing cap 28 against the spring 37 thereby permitting the movement of the bearing cap along the shaft 17, as is best illustrated in Figure 3. Since the race 20 is press-fitted on the bearing portion 18 of the shaft, it is prevented from moving along the shaft, and consequently, the race and bearing cap 28 are maintained in fixed relation with respect to each other. In spite of the fact that the bearing cap 28 is released from clamping engagement with the bearing support 16 and the bearing cap 25 is removed, the parts are still so arranged with respect to each other that no more foreign material can enter the grease retaining space than could have entered the grease retaining space when the parts were in assembled position as will be noted by a careful inspection of Figures 1 and 3. The secondary grease ring 34 shown in Figure 3 has a cylindrical portion concentric with the axis thereof upon which the inner annular portion 29 of the bearing cap 28 is arranged to slide, and this cylindrical portion of the ring 34 is of sufficient length to prevent the uncovering of the grease retaining space even when the bearing cap 28 is moved into the position shown in Figure 3 after the bearing cap 25 is removed. Not only is the grease retaining space effectively enclosed after the bearing cap 25 is removed, but it is also effectively enclosed even though the end bracket 10 is removed after first removing the bolt 13'. Of course, the primary grease seal 27 protects the other side of the grease retaining space and the anti-friction bearings and bearing surfaces.

The shaft may then be removed from the frame 16 with the bearing thereon.

In Figure 4, I have shown a modified arrangement for holding the secondary grease retaining ring 34 in place and for limiting the movement of the bearing cap 28 along the shaft 17. In place of using the ring 35, I use an ordinary coiled spring 44 and in place of the spring 37, I use a ring 45 which is secured to the shaft 17 by means of a set screw 46 which is threaded in the ring 45 and extends into a depression 47 in the shaft. The operation of the device shown in Figure 4 is substantially the same as that shown in Figure 3.

It is thought that the invention and numerous of its attendant advantages will be fully understood from the foregoing description and it is obvious that numerous changes may be made in the form, construction and arrangement of the several parts without departing from the spirit or scope of my invention or sacrificing any of its attendant advantages; the forms herein described being preferred embodiments for the purpose of illustrating my invention.

Having thus described my invention, what I claim as new and desire to secure by Letters Patent is:

1. In a support for rotating shafts, a frame having an opening, support means to rotatably support a shaft in the opening, means to lubricate the support means and retaining means to prevent the escape of lubricant along the shaft, said means comprising an annular cap embracing the shaft and formed to define a lubricant chamber adjacent the shaft support means from which the lubricant may escape onto the shaft support means, said cap having a portion forming a collar closely embracing the shaft and an oil slinger formed on the shaft adjacent the end of said collar to eject lubricant from the shaft at that point and a lubricant feeding ring shiftably mounted in the chamber and resiliently depressible therein to utilize end play of the shaft in continually feeding the lubricant to the shaft support means.

2. In a support for rotating shafts, a frame having an opening, support means to rotatably support a shaft in the opening means to lubricate the support means and retaining means to prevent the escape of lubricant along the shaft, said means comprising an annular cap embracing the shaft and formed to define a lubricant chamber adjacent the shaft support means from which the lubricant may escape onto the shaft support means, said cap having a portion forming a collar closely embracing the shaft and an oil slinger formed on the shaft adjacent the end of said collar to eject lubricant from the shaft at that point, and a spring pressed ring mounted in said chamber and normally urged toward the shaft support means to utilize end play of the shaft in feeding lubricant from the chamber to the support means.

In witness whereof, I have hereunto subscribed my name.

FRANK ADAMS.